US005244223A

United States Patent [19]

Uchiyama

[11] Patent Number: 5,244,223

[45] Date of Patent: Sep. 14, 1993

[54] WHEELCHAIR

[76] Inventor: Toshifumi Uchiyama, 2-1-17 Higashi Daimotsu-cho, Amagasaki City, Hyogo Pref., Japan

[21] Appl. No.: 829,304

[22] Filed: Feb. 3, 1992

[51] Int. Cl.[5] .............................................. B62M 1/14

[52] U.S. Cl. .................................... 280/250.1; 280/42

[58] Field of Search ....................... 280/250.1, 642, 42, 280/650, 657, 644

[56] References Cited

U.S. PATENT DOCUMENTS

| | | | |
|---|---|---|---|
| 4,062,555 | 12/1977 | Peng et al. | 280/42 |
| 4,386,790 | 6/1983 | Kassai | 280/42 X |
| 4,861,056 | 8/1989 | Duffy et al. | 280/42 X |

FOREIGN PATENT DOCUMENTS

| | | |
|---|---|---|
| 5269758 | 11/1950 | Japan . |
| 49-13445 | 2/1974 | Japan . |
| 6210782 | 7/1987 | Japan . |

*Primary Examiner*—Charles A. Marmor
*Assistant Examiner*—Gary C. Hoge
*Attorney, Agent, or Firm*—Wall and Roehrig

[57] ABSTRACT

A wheelchair formed from a pair of handle pipes, seat pipes, front pipes, rear pipes and two pairs of front and rear cross pipes. The main body of the wheelchair can be folded simultaneously in a front-to-rear, a left-to-right, and up-and-down directions by pivoting the seat pipes toward the handle pipes. Steps are formed in a double-door fashion and are installed, movable in the front-rear direction so that the steps can be storable inside the wheelchair main body, when folded. Foldable and detachable arms are also mounted so as to be folded with the main body.

4 Claims, 8 Drawing Sheets

WHEELCHAIR

BACKGROUND OF THE INVENTION

This invention relates to a portable wheelchair having a light weight frame and compact construction. More specifically this invention relates to an easy to use wheelchair which can be folded in three independent planes, namely, front-to-rear, up-and-down, and left-to-right. The wheelchair further includes double folding foot rests which can be stored inside the folded wheelchair.

Wheelchairs generally can be categorized in two groups; one being a motor driven chair, and the other being a manual type in which the chair can be propelled by a person seated in the chair turning the device. The manual-driven type wheelchair is usually constructed so it can be folded when not in use.

The conventional type of manual wheelchair can be folded only in one plane, either along its width direction or its front-to-rear direction. The width of a wheelchair which is folded in the front-to-rear direction cannot be reduced. Similarly, the length of a wheelchair, which is folded in the width direction cannot be reduced along its front-to-rear direction. The conventional type of wheelchair, when folded, thus still is relatively large and difficult to carry or store.

OBJECTS OF THE INVENTION

It is therefore an object of the present invention to provide a portable and easy-to-carry wheelchair similar to a baby carriage, which is constructed to be folded by a one-touch operation in three planes, namely front-to-rear, left-to-right, and up-and-down directions, so that the wheelchair becomes a compact structure.

A wheelchair according to the present invention includes a handle pipe, seat pipe, front pipe, rear pipe, two pairs of front and rear cross pipes, and foot rests or steps. The significant improvements of the present invention can be described as follows:

(1) The main body of the wheelchair can be folded in the front-to-rear, left-to-right, and up-and-down directions simultaneously by interconnecting the various pipes.

(2) The steps are formed in a double-door arrangement and are movable in a front-to-rear direction so that the steps can be stored inside the wheelchair body when the chair is folded.

(3) Step pipes for supporting said steps fold simultaneously with the main body.

(4) Arm portions are also assembled to fold with the main body.

The wheelchair according to the present invention comprises a pair of seat pipes pivotally joined at one end to a pair of handle pipes for movement in the up-and-down direction. A pair of front pipes and rear pipes are pivotally joined together at the upper ends and pivotally joined to a bracket on the underside of the seat pipes on each side of the chair for movement in the same up-and-down plane.

A rotatable connecting pipe is pivotally connected to the bottom of each handle pipe and also to the rear end of another connecting pipe, which pipe is pivotally joined at its front end to said front pipes between the upper and lower ends thereof. The rotatable connecting pipe also is pivotally connected to said rear pipes adjacent the lower ends thereof.

A pair of rear cross pipes are pivotally connected at the upper end to said handle pipes and at the lower end to said rotatable connecting pipes. A pair of front cross pipes are similarly pivotally joined at the upper ends to said seat pipes and at the lower ends to said front pipes adjacent the bottom ends thereof These front and rear cross pipes serve in size or fashion to allow the side frames of the wheelchair toward and away from each other.

The front pipes carry at the lower end rotatable front wheels and the rear wheels which have a hand rim are rotatably mounted in brackets fixed to said rear pipes midway between the top and bottom ends thereof. The wheelchair can thus be folded in right-left, up-and-down, and front-to-rear directions by operating the rotatable connecting pipes which are pivoted to the handle pipes, the connecting pipes being installed between the front pipes and the rotatable connecting pipes, and the two pairs of front and rear cross pipes.

The wheelchair of this invention includes double-door type steps which are carried on a pair of left and right side step pipes arranged to move with said wheelchair main body to push or pull freely in the front-to-rear direction through an upper bracket that is rotatably joined at its upper end to the rear pipe for movement in the front-to-rear direction and connected at its lower end to a bracket joined to said connecting pipes through said left and right side front pipes.

The double-door type steps are installed on step pipes which are pivotally mounted on the lower portion of the left and right front side pipes through a bracket rotatable in a front-to-rear direction to move freely in the front-to-rear direction.

The wheelchair of the present invention has left and right side arms, the rear ends of which are rotatably connected to the handle pipes to move in an up-and-down direction. The arms are pivotal in a horizontal plane through a releasable supporting pipe engaged at its lower end by a pivotally mounted male stud in telescopic fashion and is secured in an operable position by an L-shaped latch.

The mechanical functioning of the wheelchair of the present invention will be described in greater detail below. In use, the legs of the wheelchair are opened and the sitting surface, which is formed by the seat pipes that are pivoted relative to the handle pipe in an up-and-down direction to a horizontal sitting position, is supported horizontally by the front pipe. The front pipe is pivotally joined to said seat pipe and to the rear pipe. The distance between the handle pipe and the front pipe is maintained by the front and rear cross pipes.

When the main body of the chair is to be folded, the seat pipe is rotated upwardly around the pivoting axis connecting the handle pipe and seat pipe as a fulcrum point. The front cross pipe is interlocked with this rotative movement to close the chair in the chair width direction. The rotatable connecting pipe is pushed through by a connecting pipe which is installed between the front pipe and the rotatable connecting pipe to rotate it rearwardly. Hence, the back side cross pipe is closed along its width direction, and the rear pipe and the front pipe are gradually folded by a rotative movement of this rotatable connecting pipe at the fulcrum point formed about the pivoting axis connected to the seat pipe. The step pipe will be folded in a similar manner as the front pipe and the arm portions will also be rotated upwardly at the fulcrum point of their joint connections.

By rotating the seat pipe upwardly, the pairs of handle pipes, seat pipes, front pipes, rear pipes and step pipes will be further closed along the width direction. When the seat pipe is rotated to the position where it is almost overlapping the handle pipe, the main body becomes folded in both left-to-right and front-to-rear directions and also is folded in an up-and-down direction by the action of the rotatable connecting pipe.

In a completely folded position the rotatable front wheel mounted at the lower end of the front pipe is stored inside the rear wheel. By setting the double-door type step upright and pushing it backwardly, it can be stored inside the rear wheel. The arm portions are held in an upwardly inclined position through the arm supporting pipes.

In order to open the wheelchair from the completely folded position, the seat pipe should be rotated downwardly in exactly the opposite movement for the folding procedure. The front cross pipe is interlocked with this movement to open along the right-left direction, and the rotatable connecting pipe is rotated forwardly through the connecting pipe connecting the front pipe and said rotatable connecting pipe. Therefore, the rear side cross pipe will also be opened in the left to right direction, and the front pipe, rear pipe and step pipe will be opened in a front-to-rear direction. Finally, the legs can be completely opened when the seat pipe is horizontally positioned.

The arm portions will be rotated forwardly through the releasable supporting pipe by rotating the seat pipe and be maintained at its horizontal position. The releasable supporting pipe at the lower end is normally telescoped over a male lug pivotally mounted on a bracket which is fixed to the seat pipe as a unit structure. Said supporting pipe is tightly locked to said lug by an L-shaped latch which is pivotally mounted on said supporting pipe. Hence, by rotating the L-shaped latch outwardly to release the supporting pipe from the male lug, the bottom of the releasable supporting pipe can be released from the wheelchair frame. By rotating the released arm upwardly, one can access from the wheelchair either from the left or right side.

The double-door type step can be opened by pulling forwardly and pushing downwardly the step after opening the legs of the wheelchair main body.

A brake mechanism, for example, a rotative lever-type brake which engages the rear wheel through a link mechanism can be employed.

Figure 1:
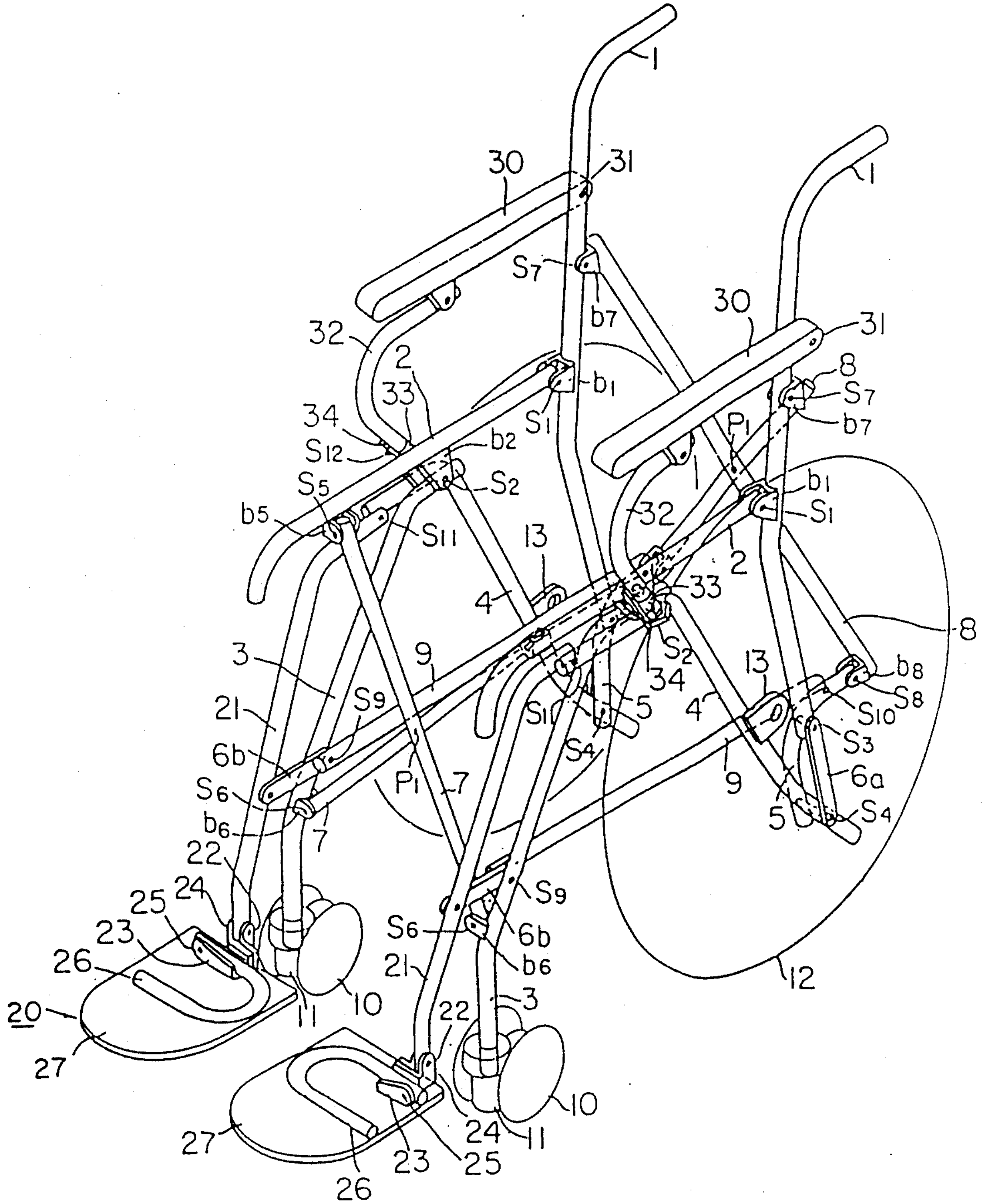
FIG. 1 is perspective view of a wheelchair according to present invention.

The parts are numbered throughout the specification and drawings as follows:

1 . . . handle pipe
2 . . . seat pipe
3 . . . front pipe
4 . . . rear pipe
5 . . . rotatable connecting pipe
6 . . . connecting rod
7 . . . front side cross pipe
8 . . . rear side cross pipe
9 . . . connecting pipe
10 . . . front wheel
12 . . . rear wheel with hand rim
20 . . . double-door type step
21 . . . step pipe
30 . . . arm

DETAILED DESCRIPTION OF THE PREFERRED EMBODIMENT

Figure 2:
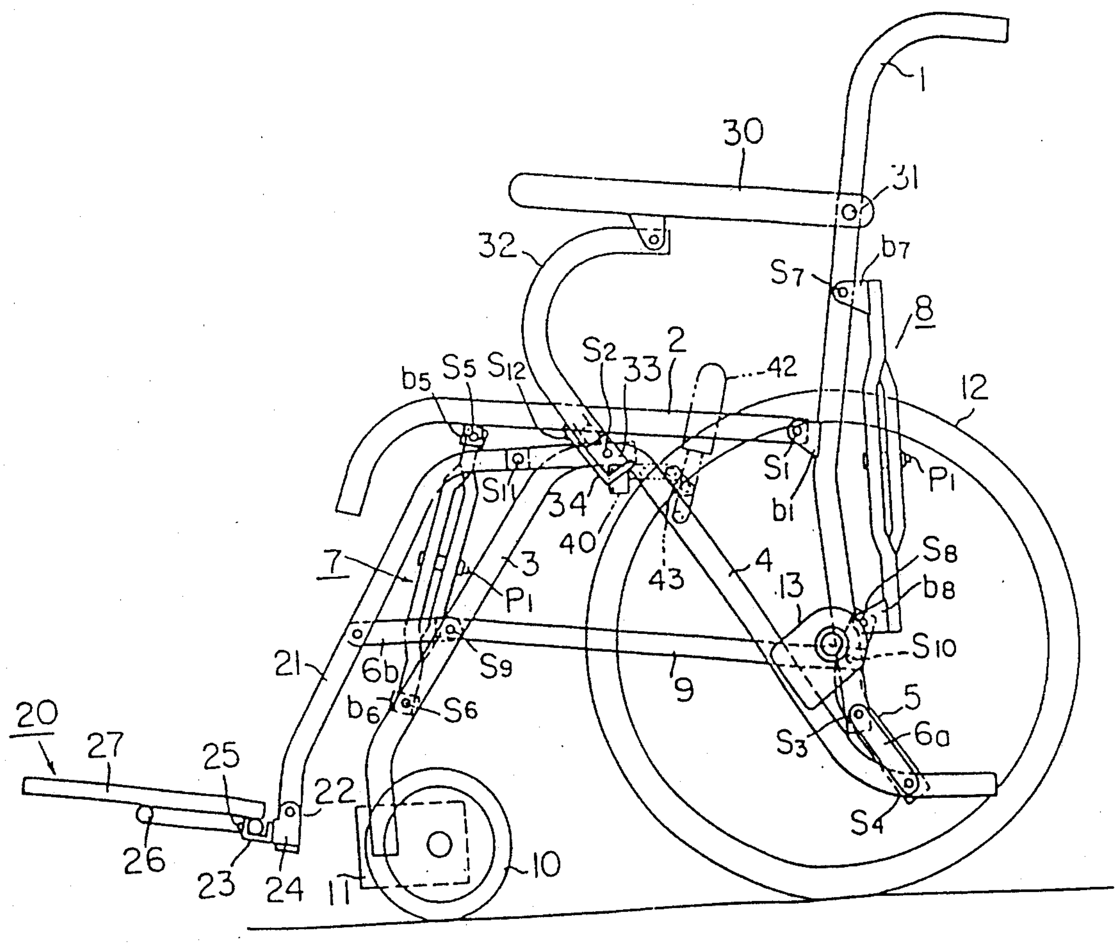
FIG. 2 is a side view when the wheelchair is in operative position.
Figure 3:
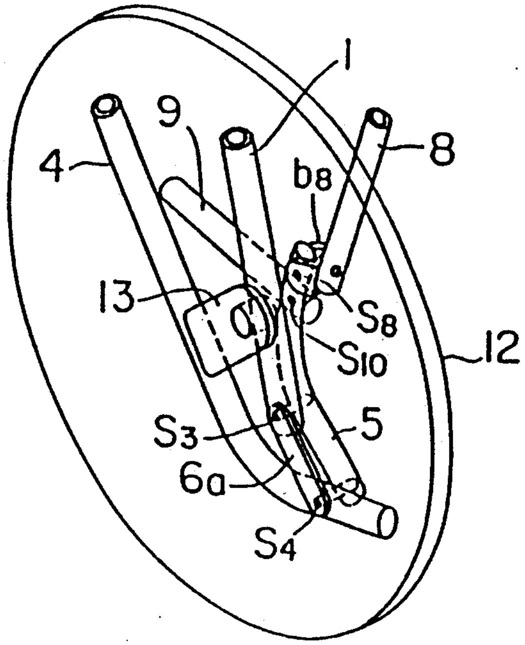
FIG. 3 is a perspective view showing the mounting of the rear wheel of the wheelchair.
Figure 4:
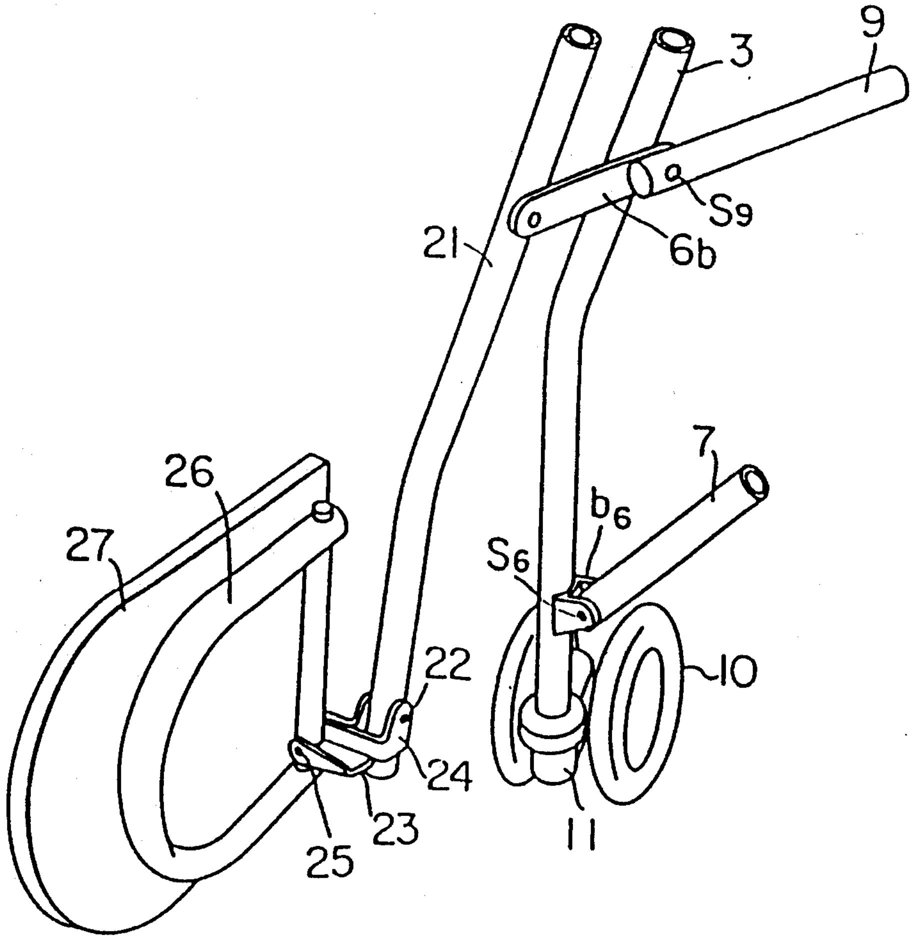
FIG. 4 is a perspective view showing in enlarged scale the step portion of the wheelchair.

Referring now to FIGS. 1 and 2, the wheelchair according to the present invention includes a pair of handle pipes 1, each of which is parallel to each other, a pair of seat pipes 2 are pivotally mounted for upward/downward motion about pivoting axis s1 (in a bracket (b1)) fixed to said handle pipe. Front pipes 3 and rear pipes 4 are both rotatably pivoted in front-to-rear direction about pivoting axis s2 (in a bracket (b2)) fixed to said pipe. Rotatable connecting pipes 5 are rotatably pivoted in a front-to-rear direction (about pivoting axis s3) to the lower end of the handle pipe 1. Pipes 5 are also connected to rear pipes 4 at pivoting axis s4 at its lower end. A connecting link *6a* also pivotally joins the handle pipe 1 and the rear pipe 4 at pivoting axes s3 and s4. The two side frames of the wheelchair are joined in the front by cross pipe 7 which is free to open and/or close along the width direction by cross-forming two pipes into an X-shape and by rotatably connecting the crossed portions by a pivot pin p1. The upper ends of said cross pipe are connected to the seat pipe 2 through brackets b5 at pivoting axes s5. The lower ends are connected at the front pipes 3 through brackets b6 at pivoting axis s6. Similarly, a rear side cross pipe 8, which is free to open/close in the width direction, is also connected at its upper end to the handle pipes 1 through bracket b7 at pivoting axes s7 and its lower end is connected to said rotatable pivoting pipe 5 at axes s8. The wheelchair also includes a connecting pipe 9 having one end rotatably pivoted to front pipes 3 at pivoting axes s9 and the other end being rotatably pivoted to the rotatable connecting pipes 5 at pivoting axes s10.

A front wheel 10 is rotatably installed to the bottom of left- and right-side front pipes 3 through caster 11. A large rear wheel 12 having a hand rim is pivoted in bearing 13 fixed to the rear pipes 4.

Step pipes 21 are interlocked with movement of the main body to move forwardly/backwardly therewith. The upper ends are connected rotatably in a front-to-rear direction to the rear pipe 4 at a pivot axes s11 and the lower ends are pivoted with connecting pipes 9 to the front pipes 3 through connecting links *6b*.

A step frame element 26 of a double-door type step 20 is freely pivoted for open/close movement in a left-to-right direction to a bracket 24 having a receptacle 23 rotatably installed in a front-to-rear direction about an axial pin 22 in lower end of each step pipe 21. The double-door type step 20 is further provided with a wood or plastic step plate 27 secured to the step frame element 26.

A brake mechanism can be installed, for example as shown in FIG. 2 in dotted lines, having a lever pivotally mounted to the rear pipe 4 with a brake shoe 40 carried on the forward end. A handle 42 is pivotally connected at its lower end to pipe 4. Handle 42 also is connected to said lever through a link 43. Of course, the brake mechanism is not limited to the means described here, but can be modified or changed taking into consideration braking efficiency and ease of operation.

A seat platform 50 is formed as part of a connected structure having a sitting surface and a back portion, and preferably is releasably secured about the seat pipes 2 and the handle pipes 1. Although the material for the seat is not limited to a specific kind, a cloth seat will be the most suitable one because of its strength, endurance and comfort.

With the wheelchair structure as described above, the left-to-right distance in the open position as illustrated in FIGS. 1 and 2 is maintained by the combined action of the cross pipes 7 and 8 being moved in a front-to-rear direction by the rotatable connecting pipes 5. The distance in the front-to-rear direction is fixed by action of the connecting pipes 9 and the rotatable connecting pipes 5.

When the main body is to be folded, the seat pipe 2 is rotated upwardly about its fulcrum point of the pivoting axis s1 by grasping the handle pipe 1 and seat pipe 2 at the end portions and moving them together The main body can thus be simultaneously folded in all front-to-rear, left-to-right and up-and-down directions.

Figure 5:
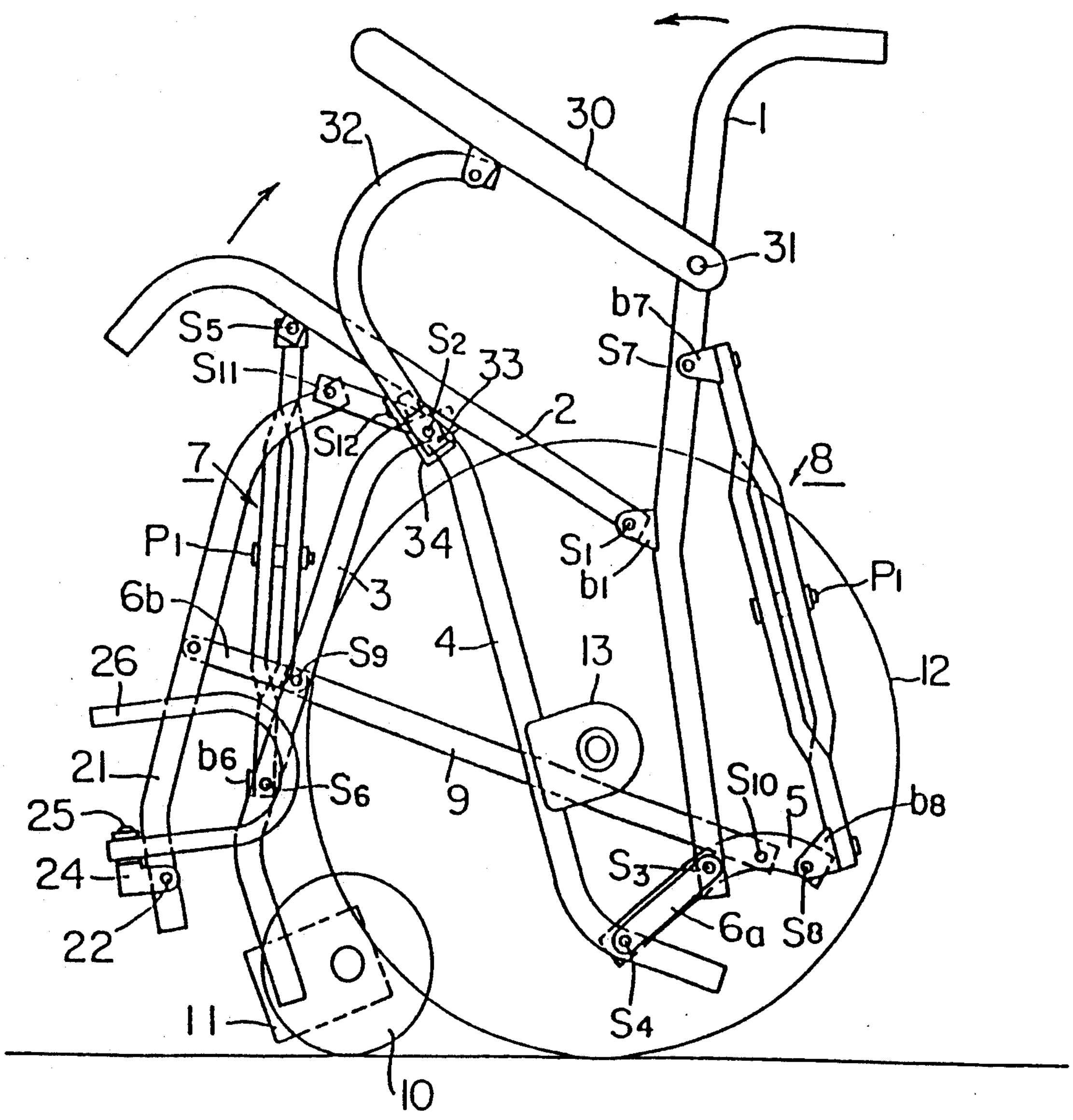
FIG. 5 is a side view showing the wheelchair in partially folded position.

As may be seen in FIG. 5, the upper and lower ends of the front side cross pipe 7 are brought together in the width direction about the fulcrum point P1 and their pivoting axes s5 and s6 by the rotation of the seat pipe and will be closed. At the same time, the rotatable connecting pipe 5 will be rotated backwardly by connecting pipe 9 so that the upper and lower ends of the rear side cross pipe 8 will be rotated in the width direction about the fulcrum point P1 and the pivoting axes s7 and s8 and will be closed. At the same time, the connecting pipe 9 will rotate upwardly about its pivoting axis s10 while the front pipe 3 and the rear pipe 4 will be folded about the pivoting axis s2. The step pipe 21 will also be folded to overlap to the front pipe 3 about the pivoting axis s11. Moreover, the arm portion 30 will be rotated upwardly about the pivoting axis 31.

Figure 6:
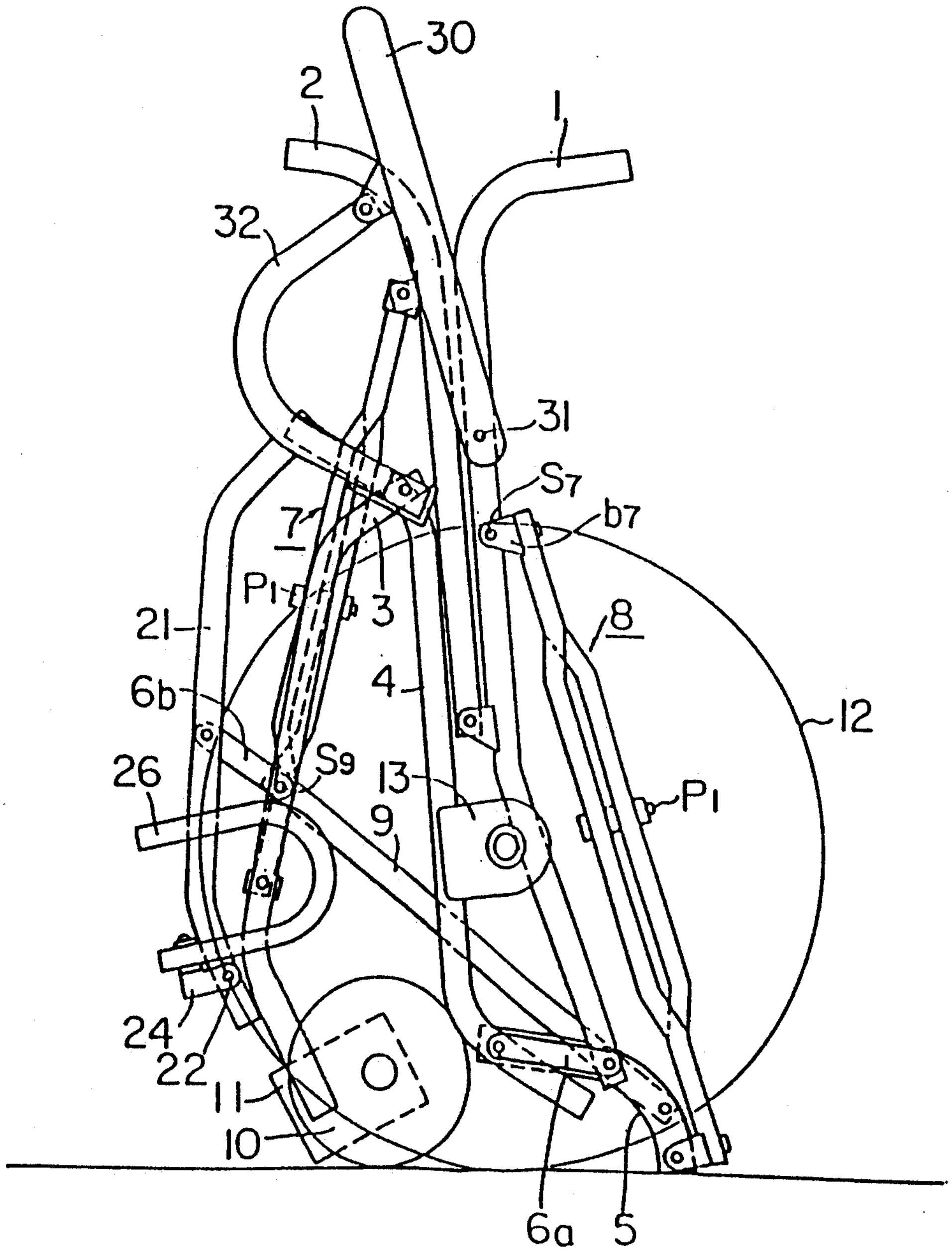
FIG. 6 is a side view of the wheelchair in completely closed position.

Once the seat pipes 2 are rotated to contact the handle pipes 1, the front pipes 3, the rear pipes 4, the front cross pipe 7 and the step pipes 21 all are approaching the handle pipe 1, and the arm portion 30 becomes inclined upwardly (see FIGS. 5 and 6).

The double-door type steps 20 are raised vertically by rotating the step portion element 26 outwardly about axial pin 25 after folding the main body. The steps 20 can be stored by rotating backwardly bracket 24 about axial pin 22.

If one wants to use the completely folded wheelchair, the sequence just described is reversed Namely, the handle pipe 1 and the seat pipe 2 are held, and the seat pipe 2 will be rotated downwardly to open the pipes in all front-to-rear, left-to-right, and up-and-down directions.

As the seat pipes 2 are opened, the front cross pipe 7 will be automatically opened in its width direction. At the same time, the rotatable connecting pipes 5 will be raised to the upright position by the connecting pipes 9 so that the rear cross pipe will be opened in the width direction and the front pipes 3, the rear pipes 4 and the step pipes 21 will be simultaneously opened in a front-to-rear direction. Furthermore, said arm portion 30 will also be rotated downwardly about pivoting axes 31 through the arm supporting pipes 32 while opening the seat pipes 2 to resume its horizontal position.

Figure 7:
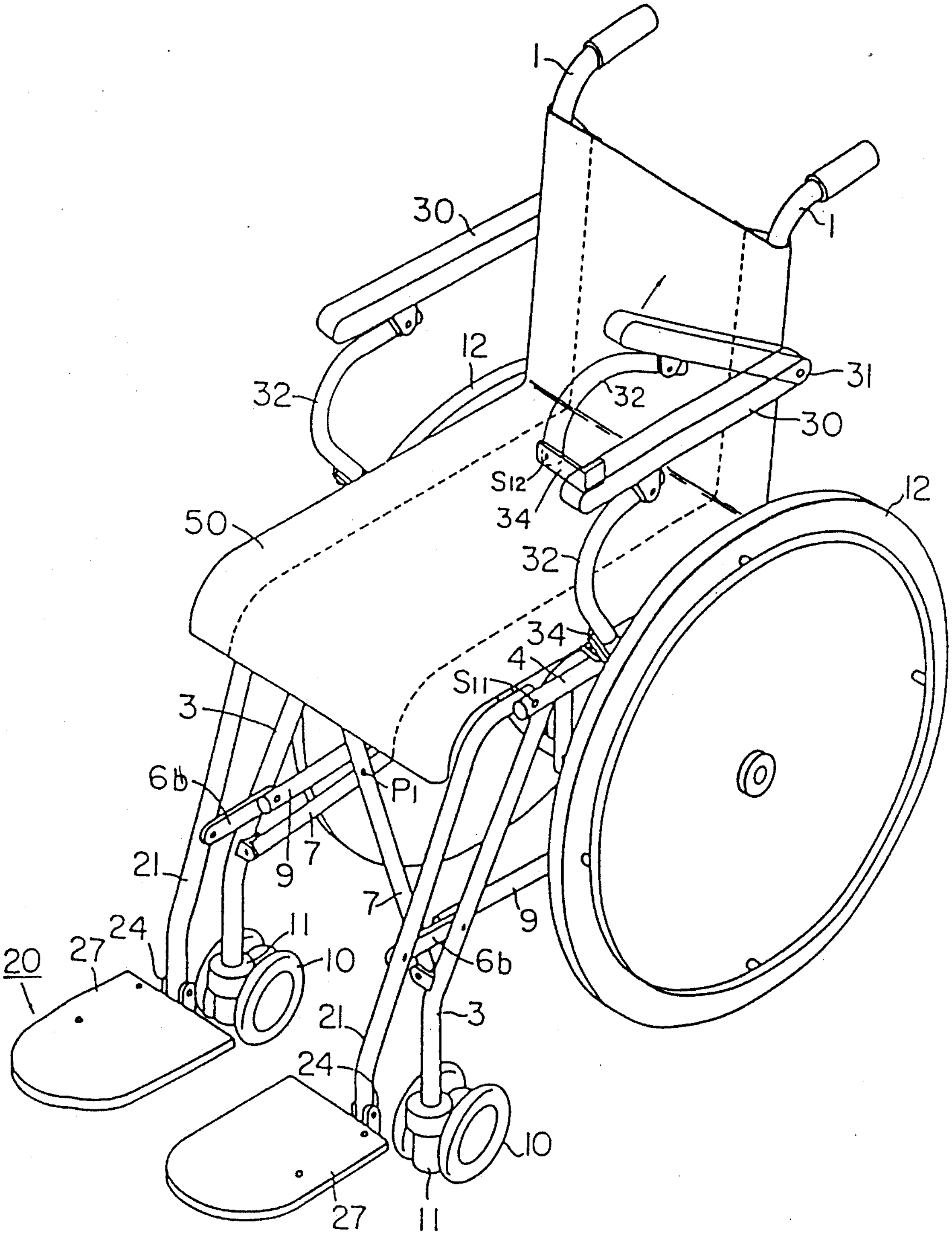
FIG. 7 is a perspective view of another means for mounting the double-door type step.

When a side of the sitting surface is to be opened by releasing the arm portion 30 from the male lug 33 and rotating it upwardly while the wheelchair is in use (see FIG. 7), the L-shaped latch 34 is rotated outwardly about axis s12 to separate it from the bottom portion of the male lug 33 and permits release from the male lug 33 by rotating the supporting pipe 32 upwardly. When one wants to use the arm portion again, the arm portion 33 should be pressed down forwardly to allow the lower end of the supporting pipe 32 to telescope over the lug 33. The L-shaped latch 34 should be rotated inwardly to locate its bottom portion right beneath the lug 33. By this operation, an accidental release of the supporting pipe 32 can be avoided.

The double-door type steps 20 can be repositioned horizontally by pulling element 26 forwardly, pushing it down inwardly and engaging the step portion element 26 in the receptacle 23 of the bracket 24.

For safety, a hand-brake such as commonly employed on bicycles can be installed at the handle portions of the handle pipes 1.

In a preferred embodiment, a cover is installed on the rear wheel 12 inside the hand rim for safety reasons to prevent fingers from accidentally being put into the spokes.

Figure 8:
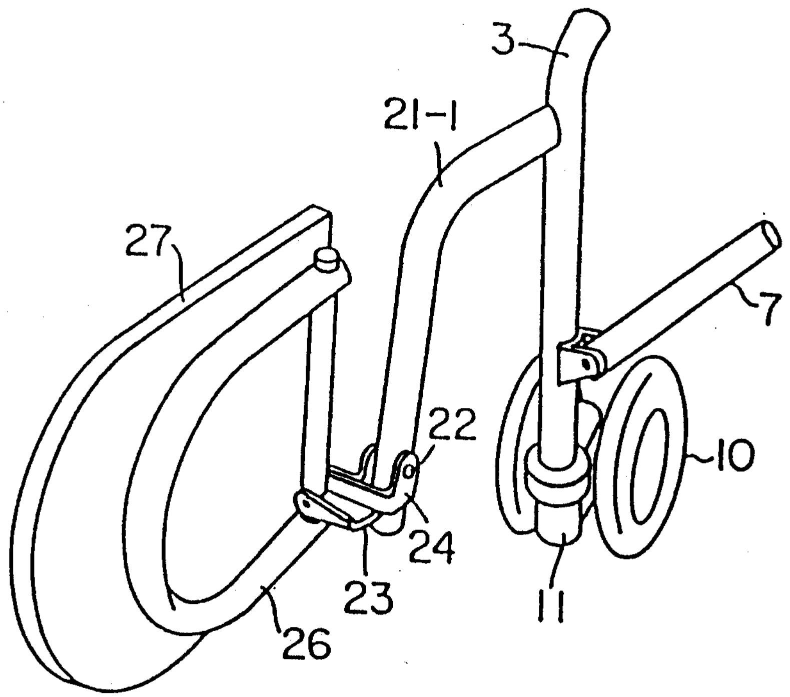
Figure 9:
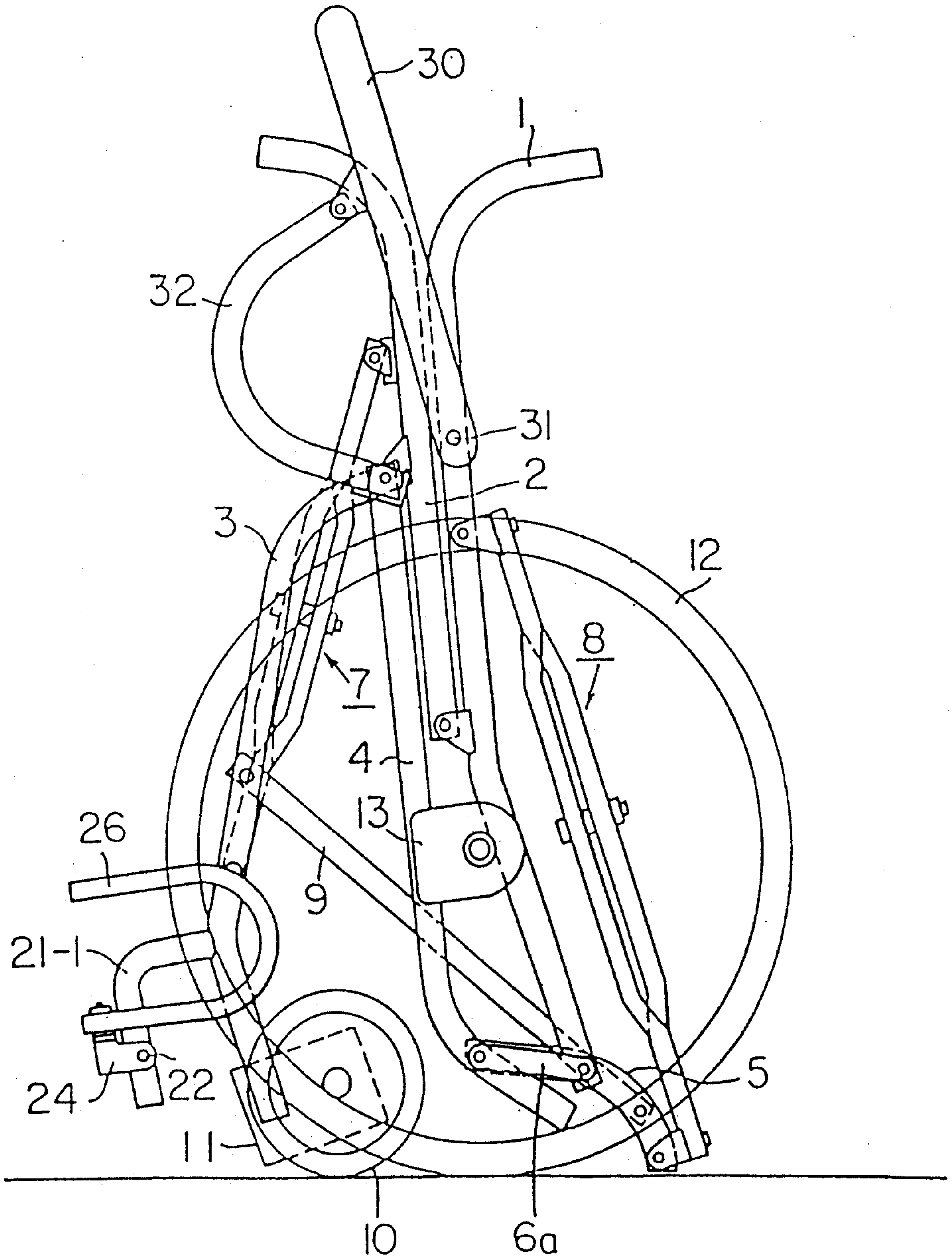
FIG. 9 shows a side view of said step portion of FIG. 8 with the wheelchair in a folded position.

Although the wheelchair illustrated in FIGS. 1-7 is constructed so that the step pipes which carry the steps can be simultaneously folded with the main body, a fixed step mounting can be projection welding a step pipe 21-1 to the front pipe 3, as shown in FIGS. 8 and 9. Step pipe 21-1 carries at its lower end the same bracket 24 and receptacle 23 as described in FIGS. 1-7.

It thus may be seen that a wheelchair constructed in accordance with the foregoing invention will have the following advantages:

1. Since the wheelchair can be folded in all front-to-rear, left-to-right, and up-and-down directions, it results in a compact structure. The folding mechanism is relatively simple, resulting in a lighter weight wheelchair particularly when using a light and strong material such as high strength aluminum or titanium. A highly portable and easy-to-carry structure similar to a baby carriage is thus provided.

2. Although the wheelchair is formed of simple tubing, since the main structural components such as the handle pipe, seat pipe, front pipe, and rear pipe as well as two pairs of cross pipes, connecting pipe and rotatable pipe are integrally interconnected in assembly, the main body becomes very strong, safe, and reliable.

By using pivotal connecting and interlocking mechanisms and components, opening and folding can be easily and smoothly achieved.

3. Since the step can be simultaneously folded with the main body and it can be stored inside the main body not only in the left-to-right direction but also backwardly, it becomes easier to use when compared to the unfoldable or projecting type wheelchair 4. When the wheelchair is in the folded position, the front wheel and the step are stored between the left- and right-side rear wheels and the arm portion is positioned in an upwardly inclined compact. In addition, the folded wheelchair will not take up a large space so that it is easy to store and to carry in trains or cars.

5. Since the arm portion is designed to be a flip-up style, it will be extremely convenient for one to sit in the wheelchair not only from the front, but also from the side.

6. By utilizing a releasable type seat unit formed with the sitting surface and the seat back as a whole unit, it is easy to exchange the seat. If the seat is made of cloth, it will be more comfortable.

While this invention has been explained with reference to the structure disclosed herein, it is not confined to the details set forth and this application is intended to cover any modifications and changes as may come within the scope of the following claims:

What is claimed is:

1. A wheelchair assembly is foldable to a reduced size in three planes, namely right-to-left, up-and-down and front-to-rear which comprises:

a pair of generally vertical handle pipes;

a pair of seat pipes pivotally mounted at the rear end to said handle pipes and having a pivot bracket fixed to the underside thereof which is spaced from said rear end;

a pair of front pipes;

a pair of rear pipes;

said front and rear pipes being pivotally joined together and to said seat pipes at said pivot brackets;

a pair of rotatable connecting pipes pivotally mounted about the bottom ends of said handle pipes;

said rotatable connecting pipes being pivotally connected at one end adjacent the lower end of said rear pipes;

a pair of connecting pipes pivotally connected at one end to said rotatable connecting pipes and at the other end to said front pipe adjacent the bottom end thereof;

a front x-shaped cross pipe pivotally joined at the upper ends to said seat pipes adjacent the front ends thereof and at the lower ends to said front pipes adjacent the bottom ends thereof;

a rear x-shaped cross pipe pivotally joined at the upper ends to said handle pipes above said seat pipes and at the lower ends to the other end of said rotatable connecting pipes;

a pair of small front wheels rotatably mounted on the bottom end of said front pipes;

a pair of large rear wheels rotatably mounted on a bracket fixed on said rear pipes;

seat and back means detachably secured about said pair of seat pipes and handle pipes to form a foldable seating platform;

so that by raising the front ends of said seat pipes towards said handle pipes pivotally about the rear ends of said seat pipes, said wheelchair assembly will fold in the left-to-right, up-and-down, and front-to-rear directions simultaneously to form a compact, easily carried folded wheelchair.

2. A wheelchair according to claim 1 including a pair of step pipes having a step element pivotally and rotatably mounted on the bottom ends thereof;

said step pipes being pivotally joined at the upper ends to the ends of said rear pipes;

a pair of pivot links pivotally connected at one end to the front end of said connecting pipes and at the other end to said step pipes above said step elements;

so that said step pipes will be retracted when said wheelchair is folded and said step elements may be rotated for storage within said folded wheelchair.

3. A wheelchair according to claim 1 including: a pair of arm portions pivotally mounted at the rear ends on said handle pipes;

a pair of supporting pipes pivotally joined at one end to the underside of said arm portions and at the other end to said pivot brackets fixed on the underside of said seat pipes;

so that said arm portions will be inclined upwardly adjacent said handle pipes upon folding of said wheelchair.

4. A wheelchair according to claim 3 wherein the lower ends of said supporting pipes are detachably secured to said pivot brackets so that one or both can be pivoted up out of the way for side access to the wheelchair seat.

* * * * *